United States Patent [19]
Freedman

[11] 3,807,799
[45] Apr. 30, 1974

[54] UNIVERSAL ARMREST ASSEMBLY
[76] Inventor: Gerald Freedman, 933 Lake, Wilmette, Ill. 60091
[22] Filed: Nov. 6, 1972
[21] Appl. No.: 303,785

[52] U.S. Cl. .............................. 297/417, 297/113
[51] Int. Cl. .............................................. A47c 7/54
[58] Field of Search ........... 297/113, 191, 416, 417, 297/354, 429; 108/1

[56] References Cited
UNITED STATES PATENTS
3,550,958  12/1970  Krein .................................. 297/417
3,116,093  12/1963  Bosack ............................... 297/417
3,612,606  10/1971  Swenson ............................ 297/417

Primary Examiner—Casmir A. Nunberg
Attorney, Agent, or Firm—Alter, Weiss, Whitesel & Laff

[57] ABSTRACT

An armrest assembly amenable for installation on an otherwise completely upholstered seat. The armrest of the assembly can be easily manipulated between an armrest position and out-of-the-way positions as well as a removal position. The armrest normally locks in the out-of-the-way positions and in the rest position.

7 Claims, 8 Drawing Figures

PATENTED APR 30 1974 3,807,799
SHEET 1 OF 2

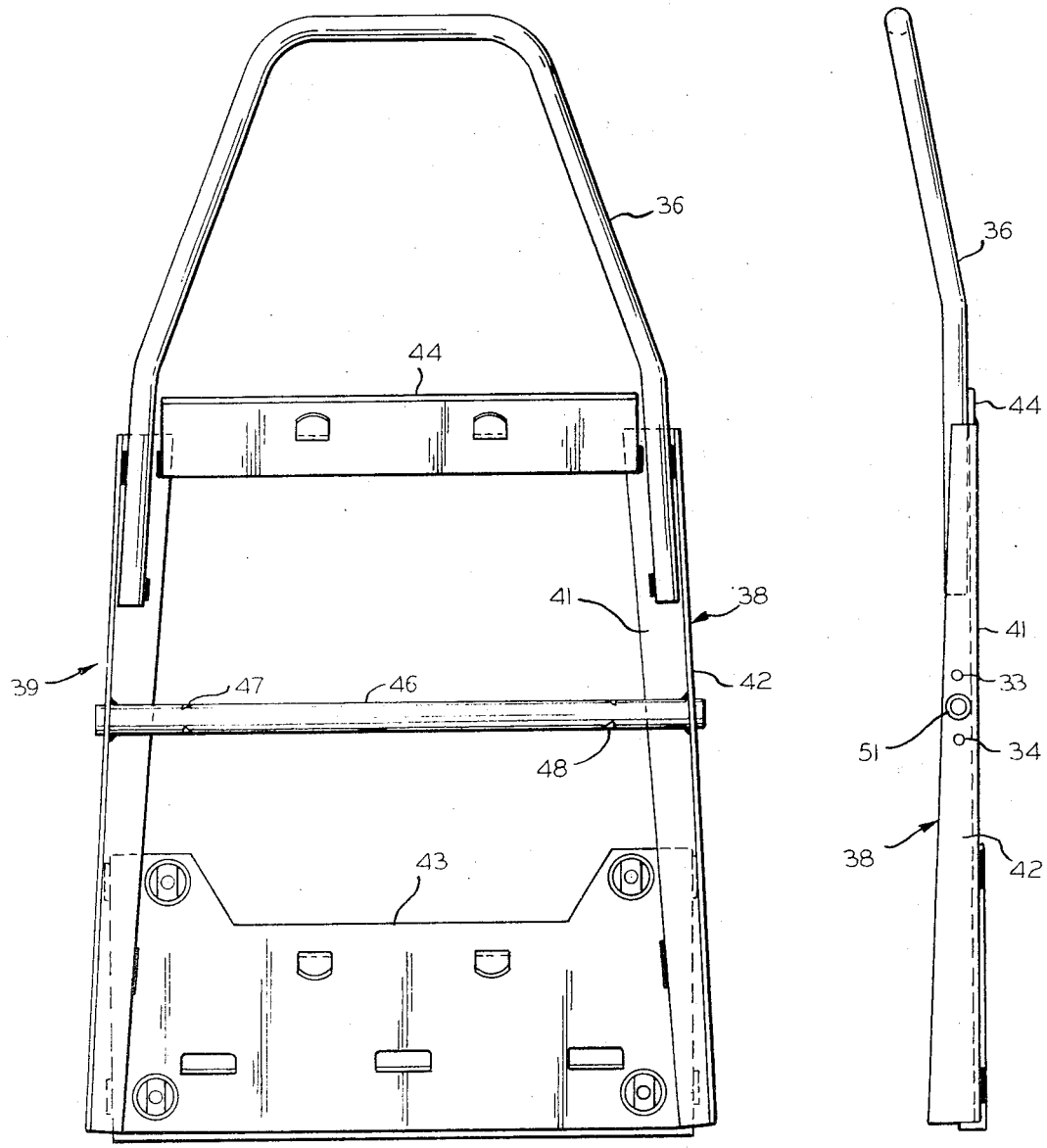
FIG.3 FIG.4
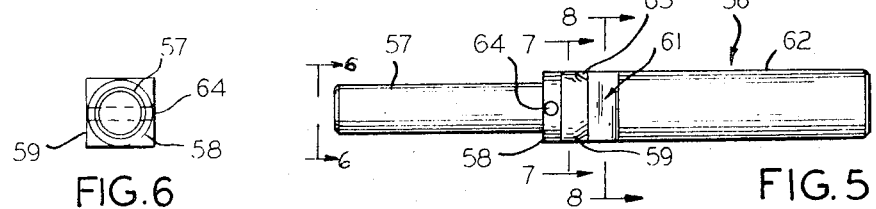
FIG.6 FIG.5
 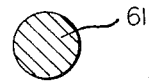
FIG.7 FIG.8

UNIVERSAL ARMREST ASSEMBLY

This invention relates generally to seats used in recreational vehicles and more particularly to the armrest assemblies for attachment to and use with such seats. Recreational vehicles are equipped with a wide variety of seats. Depending upon the model type and relative appointments of the vehicles, some of the seats are equipped with armrests, while others are not.

In the past it has been necessary to equip the seats with the armrest at the point of manufacture. More recently, kits have been available for either replacing one armrest on seats which were already equipped with armrests, or for providing armrests for the seats which were not originally equipped with armrests. In the past such kits have required special tools for installing the armrest assemblies of the kits onto the seats as well as being relatively difficult to install. A further problem is that many of the presently available armrests are impossible to move to an out-of-the-way position. The capability to so move the armrests is extremely desirable in the relatively close quarters of recreational vehicles. In addition, separate assemblies have been required for the right hand and the left hand armrests.

Accordingly, it is an object of this invention to provide new and unique armrest arrangements for vehicle seats.

A related object of this invention is to provide an armrest arrangement whereby the armrest can easily be installed on the upholstered seat after it is mounted in the vehicle, either at the factory, at the sales point of by the final purchaser of the vehicle.

Yet another object of this invention is to provide an armrest arrangement which has an installation and removal position out-of-the-way positions and a usable or armrest position.

A related object of this invention is to provide armrests which can be adroitly mounted and maneuvered from one position to the other without the use of special tools.

Yet another object of this invention is to provide armrest assemblies that are equally usable to provide right hand or left hand armrests.

In accordance with a preferred embodiment of this invention, the armrest assembly comprises an upholstered arm and means for coupling it to the seat so that the armrest can be adroitly moved between out-of-the-way positions, an in-use position and a removable position. The coupling between the seat and the upholstered arm is accomplished with an arm stop shaft that is affixed to the upholstered arm. An arm mounting bracket is provided. The bracket has a top hole and a bottom hole for mounting the bracket to the seat frame. A middle hole in the bracket is essentially rectangular in shape with a notch or keyway in the middle of a side thereof.

The armstop shaft comprises a cubical portion and cylindrical portion. The shaft is locked into position when the cubical portion is within the rectangular middle hole of the bracket.

A roll pin mounted immediately behind the cubical portion of the armstop shaft normally retains the armstop shaft locked behind the bracket with the cubical portion within the square hole. The roll pin must be aligned with the notch or the keyway to remove or assemble the armrests.

Resilient means are provided to normally retain the armstop shaft in the lock position within the squared hole. Pressure against the spring means places a cylindrical portion of the armstop shaft within the middle hole of the bracket and enables rotating the armrest to the other armrest positions.

These and other objects and features of the invention will now be explained in detail with the aid of the accompanying drawings, wherein:

FIG. 3 is a front view of the seat frame without any padding or upholstery;

FIG. 4 is a side view of the seat frame of FIG. 3;

FIG. 5 is a plan view of the armstop shaft.

FIG. 6 is a view of the armstop shaft of FIG. 5 taken along line 6—6 looking in the direction of the arrows;

FIG. 7 is a sectional view through a cubical portion of the armstop shaft of FIG. 5 looking in the direction of the arrows 7—7;

FIG. 8 is a sectional view through a cylindrical portion of the armstop shaft of FIG. 5 looking in the direction of the arrows 8—8.

Figures 1, 2:
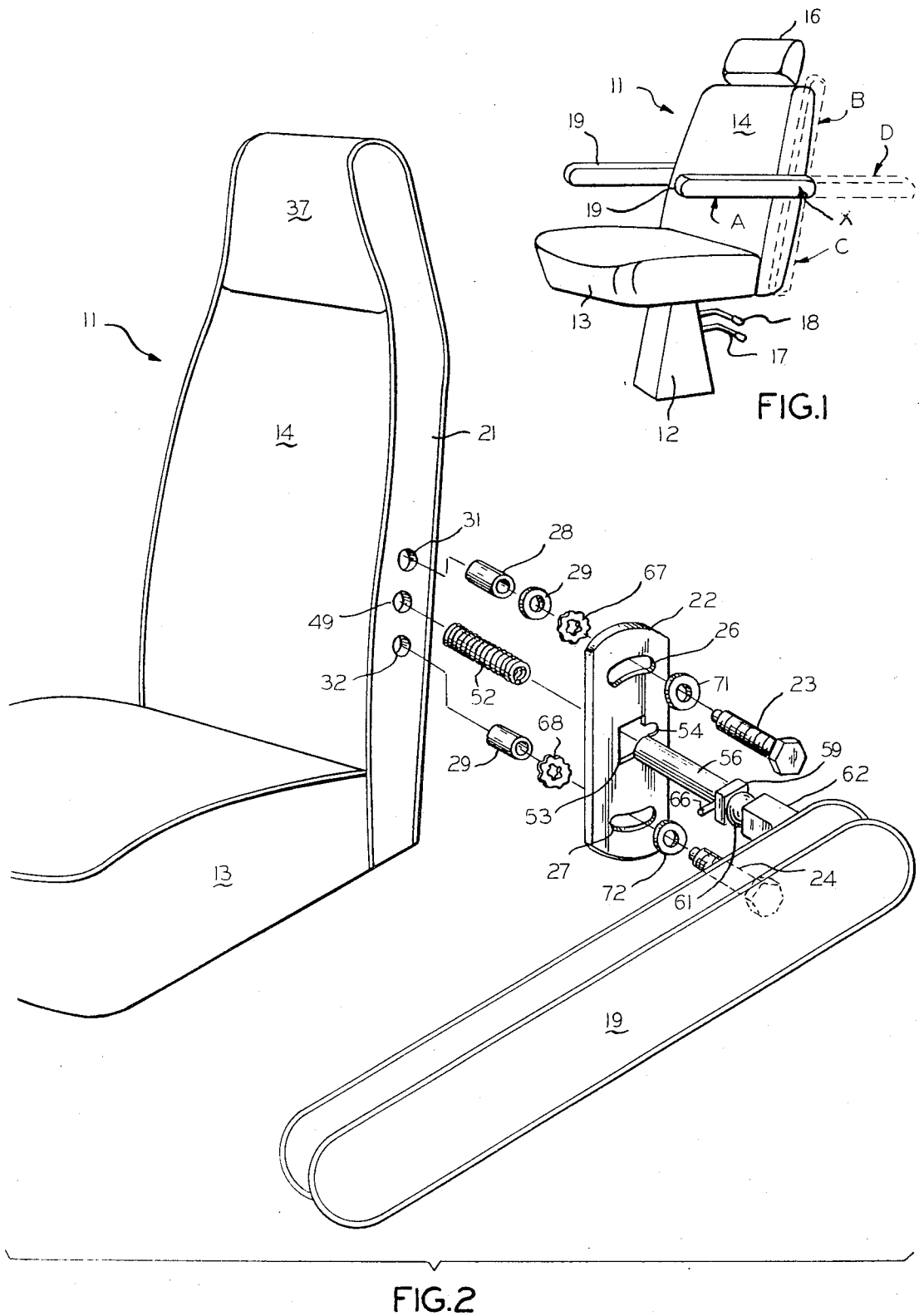
FIG. 1 is a pictorial view of the armrest assembly mounted onto a typical recreational vehicle seat.
FIG. 2 is an exploded view of the armrest arrangement showing how it is mounted or removed from the vehicle seat.

In the pictorial drawing of FIG. 1 a typical vehicle seat assembly is shown and designated as 11. It is shown as comprising a pedestal 12 through which the seat 7 is mounted onto the vehicle. A seat portion 13 is mounted onto the pedestal 12. A backrest 14 is attached in the usual manner to the seat portion 13. A headrest 16 may be provided.

Controls for adjusting the position of the seat are shown as controls 17 and 18. These controls may be used for changing the angle of the backrest, moving the seat forward or backward or adjusting the height of the seat.

Two armrests 19 are shown mounted to the seat. In accordance with the invention, it is relatively easy to remove one or both of the armrests. This is accomplished merely by pushing the armrests 19 at point X towards the backrest 14 and rotating the armrests to the position D shown in dotted line form. The armrests also may be rotated to either position B or C, which are designated as out-of-the-way positions, by first pushing the armrest at point X in towards backrest 14 and then rotating the armrest from the position A, shown in full line form, to either position B or C. Removing the force at point X pushing the armrest inward will cause the armrest to assume its normally locked position. Position A, is herein referred to as the "in-use" position.

In FIG. 2 there is again seen an upholstered seat 11 having a seat portion 13 and a backrest 14. Means are provided to mount the upholstered armrest 19 at the side 22 of the backrest 14. More particularly, an armrest bracket 22 is first attached to the side 21 of the backrest 14. This is accomplished using fastening means such as self-tapping bolts 23 and 24. The self-tapping bolts 23, 24 fit through slotted apertures 26 and 27 of bracket 22. The apertures are slotted to facilitate aligning the apertures with mounting holes in the seat backrest.

Means such as spacers 28 and 29 are provided to enable the self-tapping bolts 23 and 24 to pass through the upholstery at the side 21 of backrest 14 without damage. The bolts 23, 24 fit through mounting holes 31 and 32 respectively, drilled through the upholstery and the backrest frame.

A typical backrest frame is shown on FIGS. 3 and 4 comprises a top tubular section 36 circumscribing the outer top portion 37 of the backrest 14. A pair of oppositely disposed upstanding members 38 and 39 make up the bottom outer frame members of backrest 14.

The members 38 and 39 are fabricated from right angle plates, so that member 38 includes a back plate section 41 and a plate section 42, integral to each other and substantially at right angles.

A bottom back plate 43 is used to connect the seat portion 13 to the backrest portion 14 and to rigidize or strengthen the backrest as well as for attaching the padding and upholstery to the seat backrest. A top plate 44 is also provided for strengthening the seat and for utilization in attaching the upholstery to the seat. The plates 43 and 44 are attached to members 38 and 39 in any well known manner such as by welding. Similarly, a tubular section 36 is attached to the upstanding members 38 and 39 in any well known manner, such as by welding.

A horizontal strengthening tube 46 is provided at approximately the middle of the backrest portion of the seat. The tube 36 acts to rigidize and strengthen the frame of the backrest 14. It is attached to and extends through plate members 38 and 39. Here again, attachment may be by any well known means such as by welding.

The tube 46 is shown crimped at points 47 and 48. The crimping is utilized in the assembly and operation of the universal armrest assembly. A hole through the upholstery shown in FIG. 1 as aperture 49 lines up with the opening 51 (FIG. 4) on tube 46.

A resilient member such as spring 52 is placed through aperture 49 and into the opening 51 to retain the armrest in a normally locked position.

Bracket 22 has a characterized aperture 53 therein. The characterized aperture is shown as essentially rectangular having a notch or keyway 54 at one side thereof. In FIG. 2 the keyway is shown at the rear side of the characterized aperture.

Firmly affixed to the armrest 19 is an armstop shaft 56. The mode of affixing armstop shaft 56 to armrest 19 can be in any well known manner. The armstop shaft as shown particularly in FIGS. 5 – 8 is peculiarly shaped. There is first cylindrical longitudinal section 57 designed to fit into tube 46 without frictional juxtaposition therewith. Section 57 extends into a cylindrical section with a larger diameter having a very small longitudinal dimension 58. Section 58 is designed to slip fit into aperture 49. Therefore section 58 could have the same diameter as section 57. Both sections 57, 58 could have any configuration as long as they present no resistance to the rotation of the armrest. Section 58 extends into a squared or cubical section 59 which is a locking section. Section 59 is followed immediately by a cylindrical section 61 having a diameter sufficiently large so as to enable the armstop shaft to rotate in characterized aperture 53 while retaining section 57, 58 separated from contiguity with the inner peripheries of tube 46 or aperture 49, respectively. The cylindrical section 61 is followed by another square section 62 used in affixing the armstop shaft to the armrest. Actually the section 62 could have many different geometrical configurations. To expedite the movement between the locking section 59 and the rotating section 61 the portion of section 59 immediately adjacent and juxtaposed to section 61 may be champfered such as shown at 63.

Section 58 is shown as having an aperture 64 for press fitting therethrough means, such as roll pin 66. The roll pin 66 is used for locking the armrest behind brackets 22.

It should be noted, particularly in FIG. 2 that means are provided, auxiliary to bolts 23 and 24, for properly affixing bracket 22 to frame 39. More particularly there is shown locking washers 67 and 68 which work in conjunction with bolts 23 and 24, respectively to lock these bolts into position holding the brackets to the frame and to protect against those bolts loosening under the vibrations occuring during travel of the recreational vehicle.

Also shown is spacer washer 69 that acts to retain bracket 22 in a vertical position notwithstanding the inward slope of the oppositely disposed upstanding members 38, 39. Washers 71 and 72 may be provided to function between bolts 23, 24 and apertures 26, 27 of bracket 22, respectively.

In actual practice then if the armrest is to be assembled to the mounted seat, the holes 31, 32 and 49 are drilled through the upholstery, after carefully measuring to align those holes with the holes 33, 34 and 51 in the frame, respectively. Spring 52 is placed into hole 49. Spacers 28 and 29 are placed into the holes 31 and 32 respectively. The bracket with bolts 23 and 24 passed through apertures 26 and 27 and with the lock washers 67, 68 on bolts 23 and 24, respectively and with spacing washers 69 on bolt 23 is placed up against side 21 of the backrest 14. Bolts 23 and 24 are tightened until the holes 33 and 34 are tapped, then, the armstop shaft 56 with the armrest in the D position is inserted through characterized aperture 53 so that roll pin 66 passes through keyway 54. To accomplish this spring 52 must be compressed so that cylindrical section 61 of the shaft 56 is surrounded by the periphery of hole 63. The armrest is rotated so that the pin 66 is no longer aligned with keyway 54. The armrest is rotated 180° at this time to position A and released. The spring then exerts a force on section 58 to force section 59 into characterized aperture 53 so that the armrest locks in the A position. Similarly, when it is desired to move the armrest 19 to an out-of-the-way position force is applied at point "X" to push the armrest towards side 21 against spring 52 until section 59 is no longer surrounded by the periphery of characterized aperture 53 and instead cylindrical section 61 is now within the periphery of characterized aperture 53 and the armrest is rotated on the periphery of cylindrical section 61 to either position B or C as desired.

If the removal of the armrest is desired, then the armrest 19 is rotated into position D in a similar manner until pin 66 is aligned with keyway 54 and the armrest is no longer locked by the pin 66 behind the bracket 22 and can be easily removed and replaced.

It should be noted that the armrest 19 can be utilized either on the right side of the seat or on the left side because it is symmetrical around a longitudinal median axis. Thus, it is universal to the seats.

It should further be noted that while the bracket aperture 53 is shown having a rectangular shape, it could, within the scope of this invention, also be trapezium shaped or even ellipsoidally shaped. The locking section 59 would, of course, be conformingly shaped. In this regard it should be noted that the removal position does not necessarily have to be the "D" position, it can be any position as prescribed by the notch 54. Thus, if the backrest 14 is of the type that can be moved from the rear to the front of the seat and used in either position, the armrests could also be moved 180° for use in either position.

While the principals of the invention have been described above in connection with specific apparatus and applications, it is to be understood that this description is made only by way of example and not as a limitation on the scope of the invention.

I claim:

1. An armrest assembly for use with vehicle seats,
   said seats having a seat portion and a backrest portion,
   said armrest assembly comprising coupling means for attaching said armrests to said vehicle seats and for normally locking said armrests in a selected one of a plurality of locked positions,
   said coupling means attached to the frame of said bracket portion to support said armrest at only one end,
   said coupling means comprising shaft means attached to said armrest,
   bracket means attached to said vehicle seat for receiving said shaft means therethrough,
   said shaft means having a rotating section whereby said shaft means is enabled to rotate in said bracket,
   said shaft means having a locking section whereby said shaft means is prevented from rotating in said bracket, and
   means for selectively moving said armrest assembly to engage either said locking section or said rotating section of said shaft means in said bracket.

2. The armrest assembly of claim 1 wherein means are provided for retaining said shaft in engagement with said bracket thereby preventing the inadvertent removal of said armrest assembly from said seat, and
   means for selectively disengaging said armrest assembly.

3. The armrest assembly of claim 2 wherein said means for retaining said armrest assembly comprises pin means for attached to said shaft means,
   said bracket means comprising characterized aperture means to enable the passage therethrough of said bracket means,
   said pin means being attached to said shaft on the seat side of said bracket,
   said pin means extending beyond the normal periphery of said aperture, and
   notch means in said aperture to enable said shaft to be disengaged from the bracket when said pin means is aligned with said notch.

4. The armrest assembly of claim 3 wherein resilient means are provided for normally forcing said locked portion of said shaft into contigious relationship with said aperture.

5. The armrest assembly of claim 4 wherein said bracket means is attached to the frame of said backrest portion of said seat with said aperture means aligned with a horizontal tubular portion of said backrest frame,
   said resilient means comprising spring means placed in said horizontal tubular portion, and
   means in said horizontal tubular portion for positioning of said spring means to apply a normal force to said shaft means pushing said shaft means away from said seat thereby forcing said roll pin against said bracket and said locked section of said shaft into contigious relationship with said aperture.

6. The armrest assembly of claim 5 wherein said aperture means comprises a rectangularly dimensioned aperture and wherein said locking section of said shaft comprises a rectangular parallelepiped section on said shaft.

7. The armrest assembly of claim 6 wherein said rotating section of said shaft comprises a cylindrical section with a diameter enabling rotation of said shaft in said rectangular aperture and said horizontal tubular portion.

* * * * *

UNITED STATES PATENT OFFICE
CERTIFICATE OF CORRECTION

Patent No. 3,807,799                    Dated April 30, 1974

Inventor(s) Gerald Freedman

It is certified that error appears in the above-identified patent and that said Letters Patent are hereby corrected as shown below:

| | |
|---|---|
| Column 5, Line 23 | Delete "bracket" insert instead -- backrest -- |
| Column 5, Line 31 | After "bracket" insert -- means -- |
| Column 5, Line 34 | After "bracket" insert --means-- |
| Column 5, Line 37 | After "bracket" insert --means-- |
| Column 5, Line 39 | After "shaft" insert --means-- |
| Column 5, Line 40 | After "bracket" insert --means-- |
| Column 6, Line 4 | Delete "for" |
| Column 6, Line 7 | Delete "bracket" insert instead -- shaft -- |
| Column 6, Line 8 | After "shaft" insert --means-- |
| Column 6, Line 9 | After "bracket" insert --means-- |
| Column 6, Line 12 | After "shaft" insert --means-- |
| Column 6, Line 13 | Delete "the" insert instead --said-- and after "bracket" insert --means-- |
| Column 6, Line 14 | After "notch" insert --means-- |
| Column 6, Line 17 | After "shaft" insert --means-- and delete "contigious" insert -- contiguous -- |

UNITED STATES PATENT OFFICE
CERTIFICATE OF CORRECTION

Patent No. 3,807,799      Dated April 30, 1974

Inventor(s) Gerald Freedman

It is certified that error appears in the above-identified patent and that said Letters Patent are hereby corrected as shown below:

| | |
|---|---|
| Column 6, Line 18 | After "aperture" insert --means-- |
| Column 6, Line 30 | After "bracket" insert --means-- and after "shaft" insert --means-- |
| Column 6, Line 31 | After "aperture" insert --means-- |
| Column 6, Line 34 | After "shaft" insert --means-- |
| Column 6, Line 36 | After "shaft" insert --means-- |
| Column 6, Line 38 | After "shaft" insert --means-- |
| Column 6, Line 39 | After "shaft" insert --means-- |

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*